United States Patent
Gordon

(10) Patent No.: US 11,843,583 B2
(45) Date of Patent: Dec. 12, 2023

(54) SYSTEMS AND METHODS FOR ADJUSTING A SECURE COMMUNICATION LINK IN AN ELECTRIC POWER DISTRIBUTION SYSTEM

(71) Applicant: Schweitzer Engineering Laboratories, Inc., Pullman, WA (US)

(72) Inventor: Colin Gordon, Katy, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 474 days.

(21) Appl. No.: 17/141,405

(22) Filed: Jan. 5, 2021

(65) Prior Publication Data
US 2022/0217123 A1    Jul. 7, 2022

(51) Int. Cl.
*H04L 12/18*    (2006.01)
*H04L 9/40*    (2022.01)

(52) U.S. Cl.
CPC ........ *H04L 63/0428* (2013.01); *H04L 63/162* (2013.01); *H04L 63/164* (2013.01)

(58) Field of Classification Search
CPC ......... H04L 9/32; H04L 9/321; H04L 9/0819; H04L 9/0822; H04L 9/0833; H04L 9/0838; H04L 12/088; H04L 12/4645; H04L 47/2441; H04L 63/00; H04L 63/08; H04L 63/16; H04L 63/061; H04L 63/102; H04L 63/126; H04L 63/162; H04L 63/164; H04L 63/0272; H04L 63/0428; H04L 63/0435; H04L 63/0457; H04L 63/0876; H04W 12/50
See application file for complete search history.

(56) References Cited

U.S. PATENT DOCUMENTS

| 7,729,276 | B2 | 6/2010 | Akyol | |
| 11,265,301 | B1* | 3/2022 | Gupta | H04L 63/067 |
| 11,539,513 | B1* | 12/2022 | Hussain | H04L 65/80 |
| 2019/0116183 | A1 | 4/2019 | Hussain | |
| 2019/0173860 | A1* | 6/2019 | Sankaran | H04L 63/0272 |

(Continued)

FOREIGN PATENT DOCUMENTS

| CN | 114584973 A | * | 6/2022 | |
| WO | WO-2008040196 A1 | * | 4/2008 | H04L 63/08 |

OTHER PUBLICATIONS

IEEE Standard for Local and Metropolitan Area Networks: Media Access Control (MAC) Security, in IEEE Std 802.1AE-2006, pp. 1-150, Aug. 18, 2006 (Year: 2006).*

*Primary Examiner* — Lan-Huong Truong
(74) *Attorney, Agent, or Firm* — Fletcher Yoder, P.C.

(57) ABSTRACT

An intelligent electronic device (IED) of an electric distribution system includes processing circuitry and a memory having instructions. The instructions, when executed by the processing circuitry, are configured to cause the processing circuitry to perform operations that include receiving an indication to establish a media access control security (MACsec) communication link in accordance with a confidential mode configured to block access to communication traffic associated with the MACsec communication link, indicating that the MACsec communication link is to be established in accordance with the confidential mode, receiving establishment of the MACsec communication link in accordance with the confidential mode, and communicating data via the MACsec communication link.

11 Claims, 7 Drawing Sheets

(56) References Cited

U.S. PATENT DOCUMENTS

| | | | |
|---|---|---|---|
| 2019/0342101 A1 | 11/2019 | Hayes | |
| 2020/0106719 A1 | 4/2020 | Acharya | |
| 2020/0389499 A1* | 12/2020 | Koval | ................ H04L 63/0823 |
| 2022/0103551 A1* | 3/2022 | Talwar | ................ H04L 43/0852 |

* cited by examiner

SYSTEMS AND METHODS FOR ADJUSTING A SECURE COMMUNICATION LINK IN AN ELECTRIC POWER DISTRIBUTION SYSTEM

BACKGROUND

This disclosure relates to systems and methods for changing a mode of a secure communication link established between different components of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system during operation of the electric power distribution system. For example, an IED may receive and/or transmit a signal and/or data in order to perform a functionality, such as to control a circuit breaker in response to electrical measurements of the electric power distribution system. In some embodiments, secure communication links may be established between the IED and other components of the electric power distribution system to enable the components to securely communicate with one another. However, it may be difficult to adjust a mode of the secure communication link in order to change a functionality of the secure communication link.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, an intelligent electronic device (IED) of an electric distribution system includes processing circuitry and a memory having instructions. The instructions, when executed by the processing circuitry, are configured to cause the processing circuitry to perform operations that include receiving an indication to establish a media access control security (MACsec) communication link in accordance with a confidential mode configured to block access to communication traffic associated with the MACsec communication link, indicating that the MACsec communication link is to be established in accordance with the confidential mode, receiving establishment of the MACsec communication link in accordance with the confidential mode, and communicating data via the MACsec communication link.

In an embodiment, a control system of an intelligent electronic device (IED) of an electric power distribution system includes a tangible, non-transitory, computer-readable medium storing instructions. The instructions, when executed by processing circuitry, are configured to cause the processing circuitry to perform operations the include communicating first data via a first media access control security (MACsec) communication link established in accordance with a first mode configured to enable viewing of the first data transmitted via the first MACsec communication link, determining a second MACsec communication link is to be established in accordance with a second mode configured to block viewing of second data transmitted via the second MACsec communication link, indicating that the second MACsec communication link is to be established in accordance with the second mode, establishing the second MACsec communication link in accordance with the second mode, and communicating the second data via the second MACsec communication link.

In an embodiment, a system includes an intelligent electronic device (IED) and a gateway. The gateway is configured to perform operations that include communicating data with the IED via a first media access control security (MACsec) communication link established between the gateway and the IED in accordance with a first mode configured to enable an external device to access data transmitted via the first MACsec communication link, determining a second MACsec communication link is to be established between the gateway and the IED in accordance with a second mode configured to block the external device from accessing data transmitted via the second MACsec communication link, and generating a security association key (SAK) based on the determination that the second MACsec communication link is to be established between the gateway and the IED in accordance with the second mode. The gateway is also configured to transmit a copy of the SAK to the IED to establish the second MACsec communication link in accordance with the second mode and communicate data with the IED via the second MACsec communication link.

DETAILED DESCRIPTION

Figure 1:
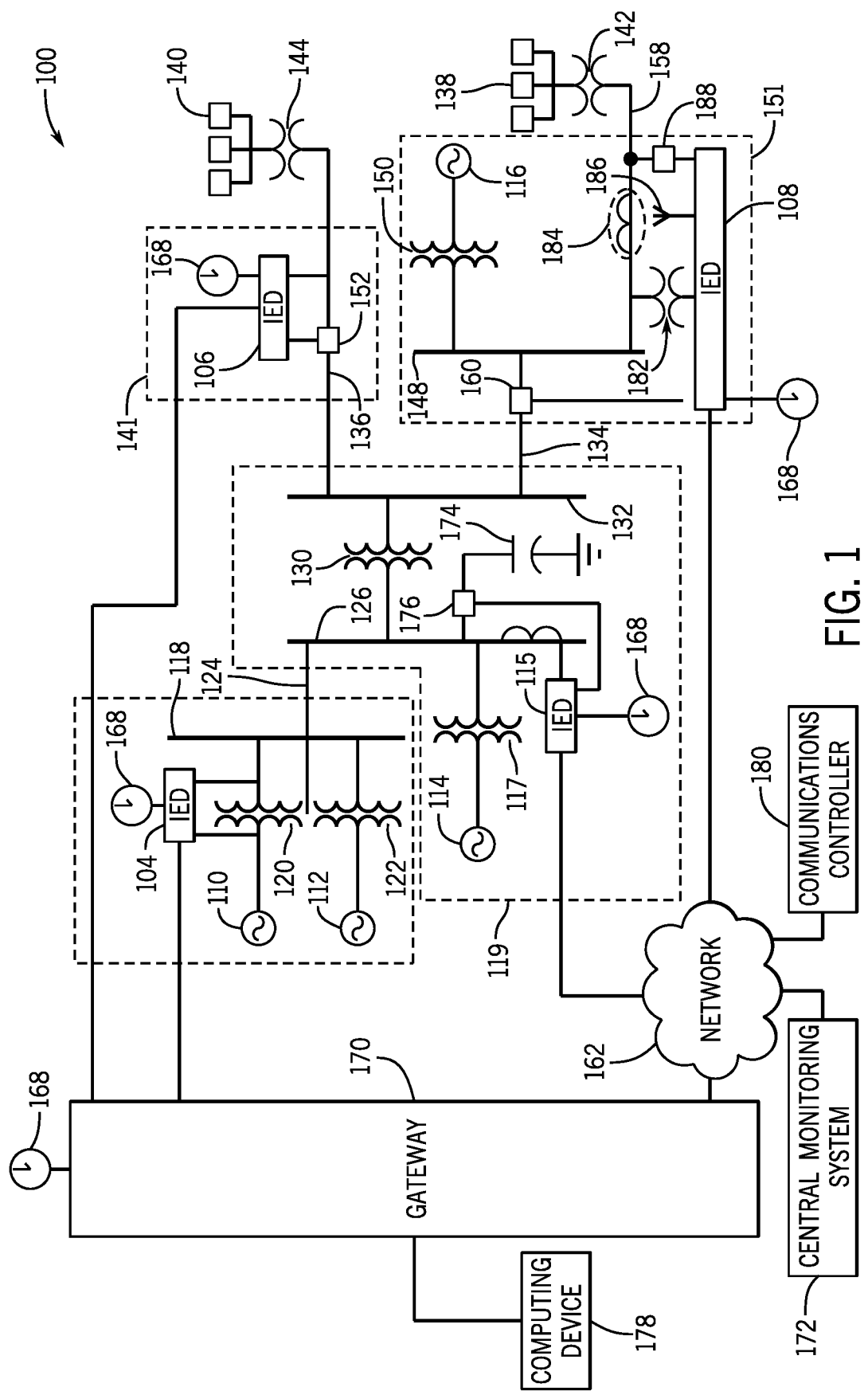
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to changing a secure communication link established between components of an electric power distribution system. Intelligent electronic devices (IEDs) may be used to control certain devices and to perform certain operations of the electric power distribution system. For example, an IED may be a relay that enables or blocks electrical power flow between other components of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of components of the electric power distribution system. As such, the IEDs may facilitate operation of the electric power distribution system.

In some embodiments, the IEDs and/or the other components may be communicatively coupled to one another via respective media access control security (MACsec) communication link and/or respective MACsec key agreement (MKA) connectivity associations to communicate data with one another. To establish the MACsec communication link between components, an MKA protocol is used to establish communication between the components. During the MKA protocol, copies of the same connectivity association key (CAK) may be distributed to the components via an adoption link (e.g., a link initially established based on verified identifiers of the components, matched settings of the components, a physical link connecting the components). An MKA connectivity association may be established between the components upon verification that each of the components possesses a copy of the same CAK. Copies of the same security association key (SAK) may then be distributed to the components via the MKA connectivity association upon verification that each of the components possesses a copy of the same CAK. The components may then use their respective copies of the SAK to establish a MACsec communication link for communicating with one another. For example, each of the components may encrypt data using their copy of the SAK and/or may decrypt encrypted data using their copy of the SAK in order to transmit data securely between one another.

It may be desirable adjust a functionality of the secure communication link established between certain components of the electric power distribution system. For example, a user (e.g., an operator, a technician) may desire to change whether data transmitted via the secure communication link is viewable or accessible (e.g., to block viewing of sensitive data being transmitted), such as with respect to users who may typically view the transmitted data for maintenance or inspection purposes. However, it may be difficult for the user to initiate changing the functionality of the secure communication link. For instance, the user may directly communicate with a gateway, but the gateway may not be configured to initiate changing the secure communication link (e.g., to enable or block access to data transmitted via the secure communication link) based on the direct communication with the gateway.

Accordingly, it is presently recognized that facilitating adjustment of the secure communication link established between components of the electric power distribution system may improve a functionality of the electric power distribution system. The present disclosure includes systems and methods for enabling changing a secure communication link via an IED. In some embodiments, there may be a first secure communication link (e.g., a first MACsec communication link) established between the IED and a gateway (e.g., in accordance with a first mode that enables access to communication traffic associated with the first secure communication link), and a computing device may be communicatively coupled to the gateway to enable direct communication between the computing device and the gateway. The computing device may transmit a request (e.g., via a user input) to the gateway to change the first secure communication link, such as to establish a second secure communication link (e.g., a second MACsec communication link) between the IED and the gateway (e.g., in accordance with a second mode that blocks access to communication traffic associated with the second secure communication link). Upon receipt of the request from the computing device, the gateway may transmit the request to the IED, and the IED may initiate establishing the second secure communication link in response. For instance, the IED may change a setting that is identifiable to the gateway to cause the gateway to perform operations that establish the second secure communication link. That is, the IED may cause the gateway to establish the second secure communication link in response to receipt of the request transmitted from the computing device to the gateway and to the IED. Thus, the secure communication link may be changed without having to configure the gateway to initiate establishment of a secure communication link in accordance with a certain mode based directly on a request transmitted by the computing device.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electric power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A gateway 170 may be in communication with the IEDs 104, 106, 108, 115. The IEDs 104, 106, 108, 115 may be remote from the gateway 170 and may communicate over various media. For instance, the gateway 170 may be directly in communication with the IEDs 104, 106 and may be in communication with the IEDs 108, 115 via the communications network 162.

The gateway 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the gateway 170. The gateway 170 may receive the data and may subsequently transmit the data to an intended recipient of the data. The gateway 170 may also control data flow between one of the IEDs 104, 106, 108, 115 and another component communicatively coupled to the gateway 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the gateway 170 and/or to send data, such as a user input, to the electric power distribution system 100 via the gateway 170. Thus, the gateway 170 may enable or block operation of the electric power distribution system 100 via the computing device 178.

A communications controller 180 may interface with equipment in the communications network 162 to create an SDN that facilitates communication between the gateway 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the gateway 170 to instruct the gateway 170 to transmit certain data (e.g., data associated with a certain set of characteristics or information) to a particular destination (e.g., an intended recipient) using flows, matches, and actions defined by the communications controller 180.

In some embodiments, the gateway 170 and the IEDs 104, 106, 108, 115 may communicate with one another via a MKA connectivity association and/or a MACsec communication link. The MACsec communication link may be initiated via SAKs distributed to enable encryption and/or decryption of data. To this end, the gateway 170 or another key device (e.g., a key server) may generate and distribute keys, such as CAKs and/or SAKs, to the IEDs 104, 106, 108, 115 to establish the MKA connectivity association and/or the MACsec communication link. For instance, the gateway 170 may establish an MKA connectivity association with one of the IEDs 104, 106, 108, 115 via an MKA protocol that includes establishing an adoption link between the gateway 170 and the IED, distributing a CAK to the IED via the adoption link, establishing an MKA connectivity association with the IED based on a verified possession of the CAK, distributing an SAK to the IED via the MKA connectivity association to establish a MACsec communication link with the IED, and using the SAK to communicate data with the IED via the MACsec communication link. Indeed, the gateway 170 and the IED may use identical copies of the same SAK to encrypt data to be transmitted as well as to decrypt encrypted data that has been received. Such encrypted data is transmitted via the MACsec communication link to transmit the data securely. Although the present disclosure primarily discusses the use of MKA connectivity associations and MACsec communication links to communicate data, any other suitable communication techniques may be used to communicate data between components of the electric power distribution system 100.

Figure 2:
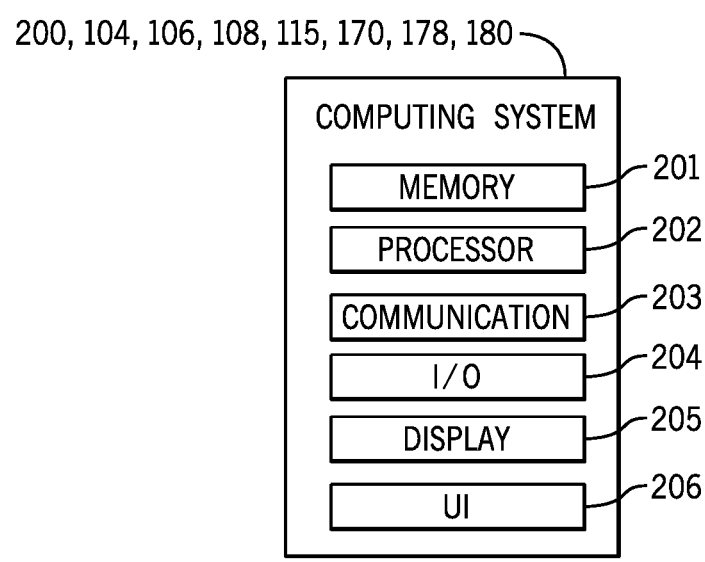
FIG. 2 is a schematic diagram of an embodiment of a computing system that may be incorporated in a component of an electric power distribution system, in accordance with an embodiment of the present disclosure.

It may be desirable to adjust a mode of a secure communication link (e.g., the MACsec communication link) established between the gateway 170 and/or the IEDs 104, 106, 108, 115 and change a functionality of the secure communication link. For example, it may be desirable to change the accessibility of data transmitted via the secure communication link. Embodiments of the present disclosure are directed to facilitating adjusting the secure communication link to change such a functionality FIG. 2 is a schematic diagram of an embodiment of a computing system 200 that may be incorporated within a component of the electric power distribution system 100, such as in any of the IEDs 104, 106, 108, 115, the gateway 170, the computing device 178, and/or the communications controller or key device or 180. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the gateway 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the gateway 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the gateway 170.

Figure 3:
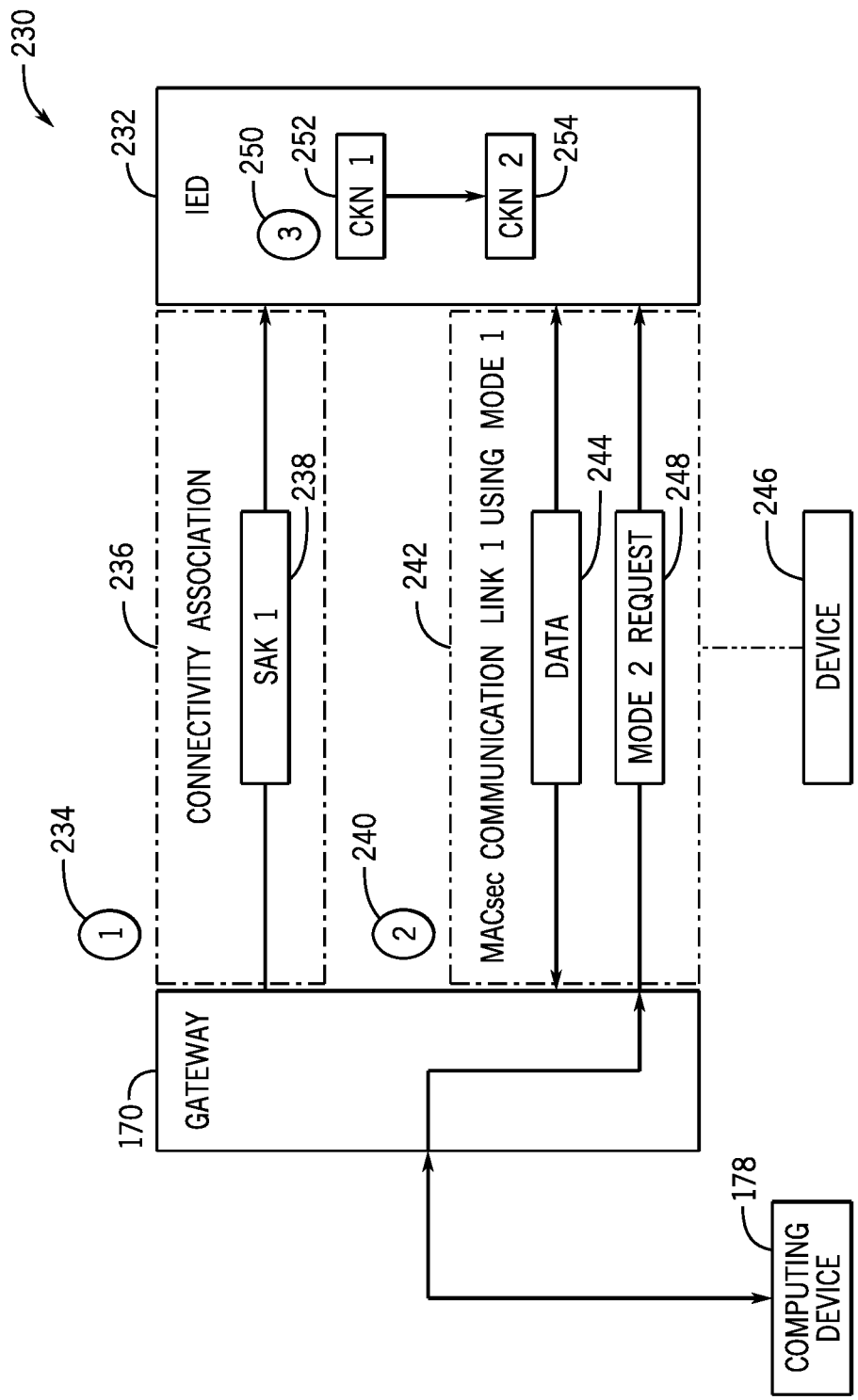
FIG. 3 is a schematic diagram of an embodiment of a procedure for adjusting a mode of a secure communication link established between a gateway and an intelligent electronic device (IED), in accordance with an embodiment of the present disclosure of the present disclosure.

FIG. 3 is a schematic diagram 230 illustrating an embodiment of a procedure for adjusting a mode of a secure communication link established between the gateway 170 and an IED 232 (e.g., one of the IEDs 104, 106, 108, 115). A similar procedure may alternatively be performed to adjust a mode of a secure communication link established between any components of the electric power distribution system 100, such as between individual IEDs. At a first block 234, a connectivity association 236 (e.g., an MKA connectivity association) is established between the gateway 170 and the IED 232. For example, the gateway 170 may transmit a copy of a CAK to the IED 232 via an adoption link previously established between the gateway 170 and the IED 232, and the connectivity association 236 may be established based on a verification that the IED 232 possesses the copy of the CAK. The gateway 170 may then transmit a copy of a first SAK 238 to the IED 232 via the connectivity association 236.

At a second block 240, a first MACsec communication link 242 may be established between the gateway 170 and the IED 232 using the first SAK 238. The gateway 170 and the IED 232 may transmit data 244 via the first MACsec communication link 242. For example, the gateway 170 may use its copy of the first SAK 238 to encrypt the data 244 to be transmitted to the IED 232 via the first MACsec communication link 242, and/or the gateway 170 may use its copy of the first SAK 238 to decrypt encrypted data 244 received from the IED 232 via the first MACsec communication link 242. Further, the IED 232 may use its copy of the first SAK 238 to encrypt the data 244 to be transmitted to the gateway 170 via the first MACsec communication link 242, and/or the IED 232 may use its copy of the first SAK 238 to decrypt encrypted data 244 received from the gateway 170 via the first MACsec communication link 242.

In the illustrated embodiment, the first SAK 238 causes the first MACsec communication link 242 to be established in accordance with a first mode, which may be a non-confidential or integrity only mode. In the first mode, communication traffic associated with the first MACsec communication link 242 may be accessible by a device 246 (e.g., a user computing device) that is external to the gateway 170 and the IED 232 communicatively coupled via the first MACsec communication link 242. For instance, the device 246 may view the data 244 (e.g., clear text data) encrypted via the first SAK 238 and transmitted via the first MACsec communication link 242. In some embodiments, the device 246 may have a limited or no ability to manipulate the communication traffic, such as to edit the data 244. However, the device 246 may be able to monitor the communication traffic flow, such as to determine whether the gateway 170 and/or the IED 232 is operating as desired, whether the data 244 is being transmitted as expected, and so forth.

In some circumstances, it may be desirable to change an accessibility of the communication traffic between the gateway 170 and the IED 232. As an example, it may be desirable to block the device 246 from being able to view the data 244 being transmitted between the gateway 170 and the IED 232. For instance, the data 244 may include confidential information, such as a passcode, personal information, and/or operating information, that is undesirable for access via the device 246 or any other external device. To this end, the gateway 170 may transmit a request 248 for establishing a secure communication link in accordance with a second mode (e.g., a confidential mode). The request 248 may be in the form of a data input, an updated SAK, another suitable signal, or any combination thereof. In some embodiments, the request 248 may be initially output by the computing device 178, such as based on a user input to request for establishing a secure communication link in accordance with the second mode (e.g., during a remote engineering access session), and the gateway 170 may receive the request 248 and transmit the request 248 to the IED 232 via the first MACsec communication link 242. In additional or alternative embodiments, the request 248 may be automatically generated and sent by the gateway 170 (e.g., without being prompted by a user input). For example, the gateway 170 may identify certain data (e.g., data having a certain amount of confidentiality based on metadata associated with the data, data indicative of a Transmission Control protocol port or a User Datagram Protocol port, data sent during a particular time of day, certain application data, data indicative of a user access request) to be transmitted to the IED 232, and the gateway 170 may generate the request 248 in response. The gateway 170 may then transmit the request 248 to the IED 232 via the first MACsec communication link 242.

At a third block 250, in response to receiving the request 248, the IED 232 may indicate that a new MACsec communication link is to be established between the gateway 170 and the IED 232 in accordance with the second mode. In the illustrated example, the IED 232 may possess a copy of the CAK that is used to establish the connectivity association 236 between the gateway 170 and the IED 232, and the gateway 170 may monitor the CAK possessed by the IED 232 to maintain establishment of the connectivity association 236. The CAK may include a CKN having various information or settings associated with properties of the connectivity association 236 and/or the first MACsec communication link 242, including an accessibility of data that is being transmitted. Upon receiving the request 248, the IED 232 may modify the CKN to change a first CKN setting 252 to a second CKN setting 254 to indicate that a new MACsec communication link is to be established in accordance with the second mode to block the device 246 from accessing communication traffic associated with the new MACsec communication link. By way of example, the IED 232 may change a value of the CKN (e.g., a data bit of the CKN) to indicate that a MACsec communication link of the second mode is to be established. The gateway 170 may identify that the first CKN setting 252 has been changed to the second CKN setting 254 and may initiate a procedure for establishing a new MACsec communication link between the gateway 170 and the IED 232 in response.

Although the illustrated embodiment includes the IED 232 receiving the request 248 from the gateway 170, in additional or alternative embodiments, the IED 232 may directly receive the request 248. For example, the request 248 may be transmitted directly from the user (e.g., via the computing device 178) to the IED 232, and the IED 232 may receive the request 248 without the gateway 170 having to initially receive the request 248 for transmission to the IED 232. In such embodiments, the IED 232 may indicate that the new MACsec communication link is to be established between the gateway 170 and the IED 232 in response to directly receiving the request 248.

Figure 4:
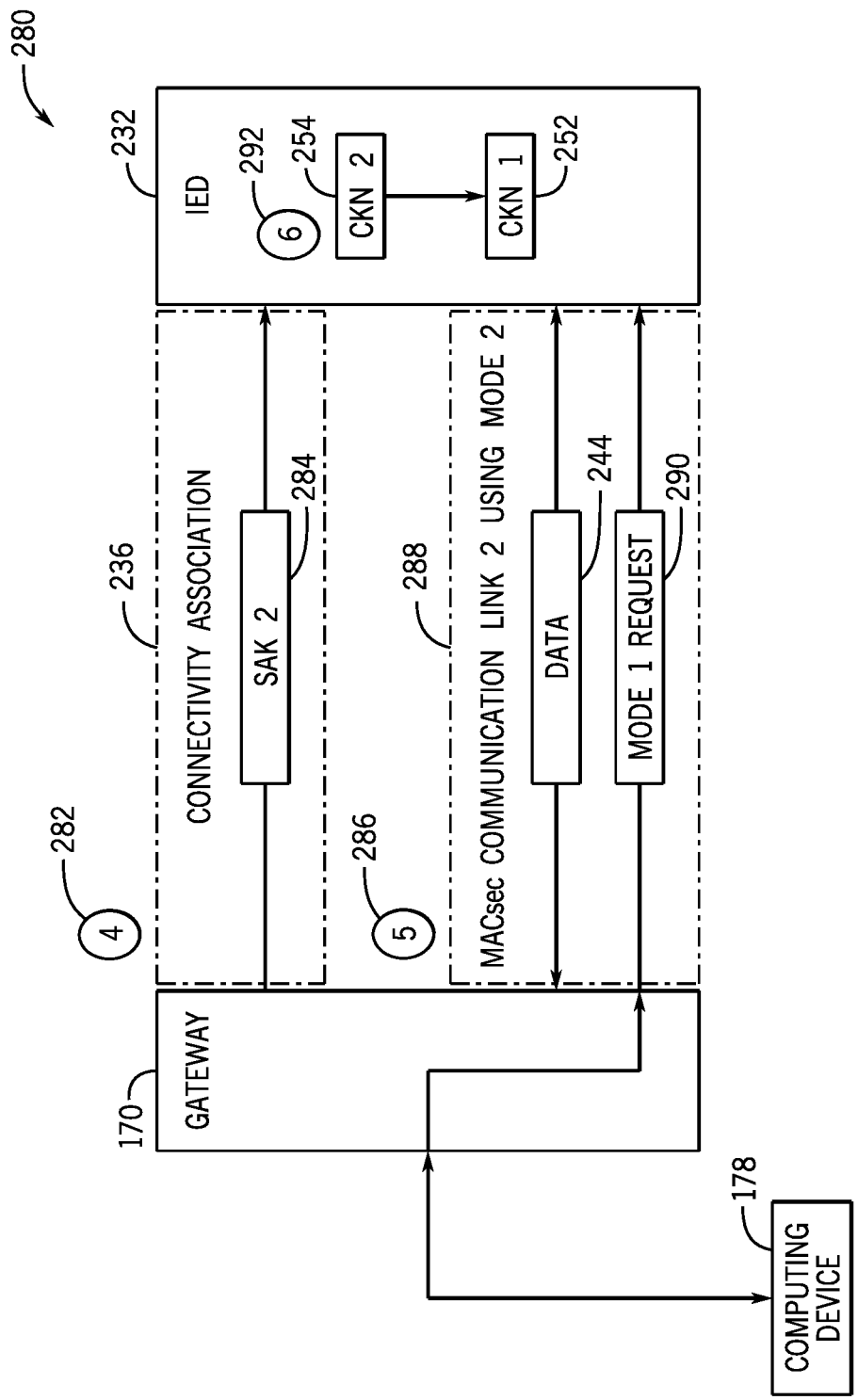
FIG. 4 is a schematic diagram of an embodiment of a procedure for adjusting a mode of a secure communication link established between a gateway and an IED, in accordance with an embodiment of the present disclosure of the present disclosure.

FIG. 4 is a schematic diagram 280 of an embodiment of a procedure for adjusting a mode of a secure communication link established between the gateway 170 and the IED 232. At a fourth block 282, in response to identifying that the IED 232 has changed the first CKN setting 252 to the second CKN setting 254 (e.g., as described with respect to the third block 250 of the schematic diagram 230), the gateway 170 may transmit a copy of a second SAK 284 to the IED 232 via the connectivity association 236. Additionally or alternatively, in embodiments in which the request 248 is transmitted via an SAK, the gateway 170 may transmit the copy of the second SAK 284 in response to a determination that a MACsec communication link is to be established in accordance with the second mode, and the second SAK 284 may include the request 248 indicative that the MACsec communication link is to be established in accordance with the second mode. At a fifth block 286, a second MACsec communication link 288 may be established between the gateway 170 and the IED 232 in accordance with the second mode via the second SAK 284. The second MACsec communication link 288 may replace the first MACsec communication link 242. That is, the gateway 170 and the IED 232 may communicate with one another via the second MACsec communication link 288 instead of via the first MACsec communication link 242. For example, the gateway 170 may use its copy of the second SAK 284 to encrypt the data 244 to be transmitted to the IED 232 via the second MACsec communication link 288, and/or the gateway 170 may use its copy of the second SAK 284 to decrypt encrypted data 244 received from the IED 232 via the second MACsec communication link 288. Additionally, the IED 232 may use its copy of the second SAK 284 to encrypt the data 244 to be transmitted to the gateway 170 via the second MACsec communication link 288, and/or the IED 232 may use its copy of the second SAK 284 to decrypt encrypted data 244 received from the gateway 170 via the second MACsec communication link 288. The device 246 may not be able to access communication traffic associated with the second MACsec communication link 288. For instance, the device 246 may not be able to view the data 244 encrypted via the second SAK 284 and transmitted via the second MACsec communication link.

A new MACsec communication link may also be established in accordance with the first mode to replace the second MACsec communication link 288 established in accordance with the second mode. In other words, the secure communication link established between the gateway 170 and the IED 232 may transition from the confidential mode to the non-confidential mode to re-enable accessibility of the communication traffic between the gateway 170 and the IED 232. In some embodiments, the transition from the confidential mode to the non-confidential mode may be initiated automatically, such as based on a duration of establishment of the second MACsec communication link 288 exceeding a threshold duration and/or based on a determination (e.g., via the gateway 170 or the IED 232) that the data 244 transmitted between the gateway 170 and the IED 232 is no longer being confidential, such as based on a change in the confidentiality of the data (e.g., based on metadata associated with the data). In certain embodiments, the IED 232 and/or the gateway 170 may automatically initiate establishment of a new MACsec communication link in accordance with the first mode. In additional or alternative embodiments, the computing device 178 may transmit a request 290 to the gateway 170 (e.g., based on a user input) to establish a new MACsec communication link in accordance with the first mode, and the gateway 170 may transmit the request 290 to the IED 232.

At a sixth block 292, the IED 232 may indicate that a new MACsec communication link is to be established between the gateway 170 and the IED 232 in accordance with the first mode, such as automatically based on a determination (e.g., that the duration of establishment of the second MACsec communication link 288 exceeds a threshold duration, that the data 244 transmitted between gateway 170 and the IED 232 is not confidential) and/or in response to receiving the request 290. By way of example, the IED 232 may modify the CKN to change the second CKN setting 254 to the first CKN setting 252 to indicate that a new MACsec communication link is to be established in accordance with the first mode. The gateway 170 may identify that the second CKN setting 254 has been changed to the first CKN setting 252 and may establish a new MACsec communication link between the gateway 170 and the IED 232 in response.

Figure 5:
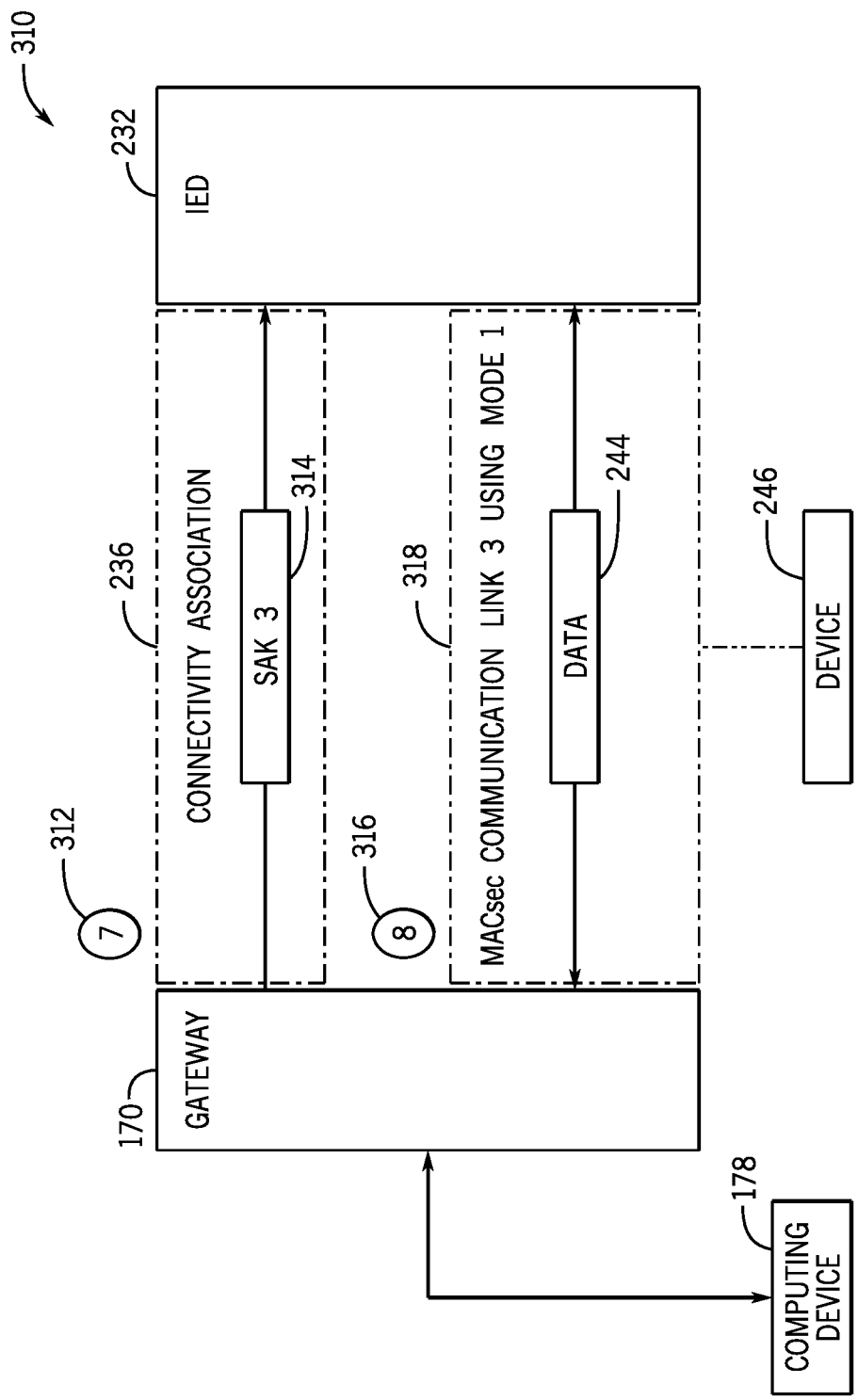
FIG. 5 is a schematic diagram of an embodiment of a procedure for establishing a secure communication link established between a gateway and an IED in accordance with a particular mode, in accordance with an embodiment of the present disclosure of the present disclosure.

FIG. 5 is a schematic diagram 310 of an embodiment of a procedure for establishing a secure communication link between the gateway 170 and the IED 232 based on the indication made by the IED 232 with respect to the sixth block 292. At a seventh block 312, in response to identifying that the IED 232 has changed the second CKN setting 254 to the first CKN setting 252, the gateway 170 may transmit a copy of a third SAK 314 to the IED 232 via the connectivity association 236. At an eighth block 316, a third MACsec communication link 318 may be established between the gateway 170 and the IED 232 in accordance with the first mode by using the third SAK 314. The third MACsec communication link 318 may replace the second MACsec communication link 288. Indeed, the gateway 170 may use its copy of the third SAK 314 to encrypt the data 244 to be transmitted to the IED 232 via the third MACsec communication link 318, and/or the gateway 170 may use its copy of the third SAK 314 to decrypt encrypted data 244 received from the IED 232 via the third MACsec communication link 318. In addition, the IED 232 may use its copy of the third SAK 314 to encrypt the data 244 to be transmitted to the gateway 170 via the third MACsec communication link 318, and/or the IED 232 may use its copy of the third SAK 314 to decrypt encrypted data 244 received from the gateway 170 via the third MACsec communication link 318. Further still, the device 246 may access communication traffic associated with the third MACsec communication link 318, such as to view the data 244 encrypted via the third SAK 314 and transmitted via the third MACsec communication link 318.

In this manner, the same connectivity association 236 may be used to transmit different SAKs 238, 284, 314 for establishing various MACsec communication links in accordance with different modes (e.g., the first mode, the second mode). However, in additional or alternative embodiments, a different connectivity association 236 may be established to establish various MACsec communication links in accordance with different modes. For example, an updated CAK may be distributed to change the connectivity association 236, and a new SAK may be distributed via the new connectivity association 236 to establish a new MACsec communication link. In further embodiments, a new connectivity association 236 may be established without changing modes of MACsec communication links. That is, for instance, a first connectivity association and a first MACsec communication link may be established in accordance with the first mode. A new CAK may be distributed via the first connectivity association to establish a second connectivity association, and a new SAK may be distributed via the second connectivity association to establish a second MACsec communication link in accordance with the same first mode (e.g., instead of in accordance with the second mode).

Each of FIGS. 6 and 7 discussed below illustrates a method for adjusting a mode of a secure communication link. In some embodiments, each of the methods may be performed by a single respective component, such as by the computing system 200 (e.g., the processor 202). In additional or alternative embodiments, multiple components may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 6:
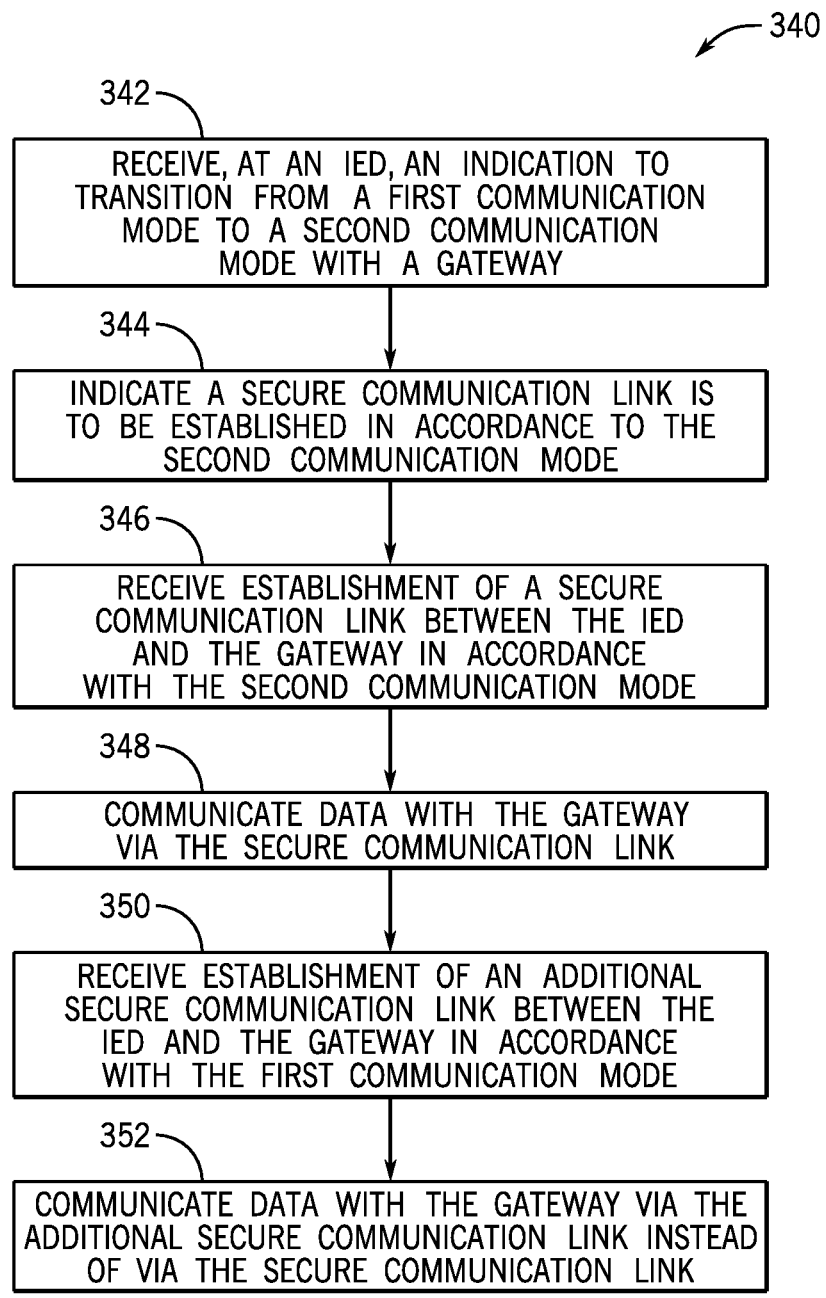
FIG. 6 is a flowchart of an embodiment of a method for adjusting a mode of a secure communication link established between a gateway and an IED, in accordance with an embodiment of the present disclosure of the present disclosure.

FIG. 6 is a flowchart of an embodiment of a method 340 for adjusting a mode of a secure communication link (e.g., a MACsec communication link). The method 340 is described from the perspective of the IED 232 for adjusting a mode of a secure communication link established between the IED 232 and the gateway 170, but a similar method may be performed to adjust a mode of a secure communication link established between other components, such as two IEDs. For example, the method 340 may be performed while there is currently a first secure communication link (e.g., a first MACsec communication link) established between the IED 232 and the gateway 170 in accordance with the first mode, which may be a non-confidential mode that enables an external device (e.g., the device 246) to access communication traffic associated with the first secure communication link. At block 342, the IED 232 may receive an indication, such as a data input and/or an SAK, to establish a second secure communication link (e.g., a second MACsec communication link) with the gateway 170 in accordance with a second mode, which may be a confidential mode. For instance, the IED 232 may receive a request from the gateway 170, such as a request initially transmitted by the computing device 178. In additional or alternative embodiments, the IED 232 may automatically identify the second secure communication link is to be established in accordance with the second mode, such as based on data (e.g., metadata associated with the data indicative of a confidentiality of the data) received from the gateway 170 and/or a user input directly received from the computing device 178.

At block 344, the IED 232 may indicate that the second secure communication link is to be established with the gateway 170 in accordance with the second mode. For example, the IED 232 may modify a CKN to indicate that the second secure communication link is to be established in accordance with the second mode. The gateway 170 may then identify the indication to establish the second secure communication link.

At block 346, the IED 232 may receive establishment of the second secure communication link between the IED 232 and the gateway 170 in accordance with the second mode. For instance, the IED 232 may receive an SAK (e.g., from the gateway 170 via a connectivity association already established between the gateway 170 and the IED 232) that is specifically generated to establish the second secure communication link in accordance with the second mode. At block 348, the IED 232 may communicate data with the gateway 170 via the second secure communication link. For example, the IED 232 may use the SAK to encrypt data to be transmitted to the gateway 170 via the second secure communication link, and/or the IED 232 may use the SAK to decrypt encrypted data received from the gateway 170 via the second secure communication link. The second secure communication link may block an external device from viewing the data encrypted via the SAK and transmitted between the gateway 170 and the IED 232.

At block 350, the IED 232 may receive establishment of a third secure communication link between the IED 232 and the gateway 170 in accordance with the first mode. For example, the IED 232 may receive a new SAK (e.g., via the already established connectivity association) that is specifically generated to establish the third secure communication link in accordance with the first mode. That is, the IED 232 is to communicate data with the gateway 170 via the third secure communication link established in accordance with the first mode instead of via the second secure communication link established in accordance with the second mode. In some embodiments, the IED 232 may automatically initiate the procedure for establishing the third secure communication link in accordance with the first mode. For instance, the IED 232 may monitor a duration in which the second secure communication link has been established between the gateway 170 and the IED 232 in accordance with the second mode. In response to determining that the duration has exceeded a threshold duration (e.g., seconds, minutes, hours, days), the IED 232 may indicate that the third secure communication link is to be established in accordance with the first mode, such as by modifying the CKN. Accordingly, the IED 232 may block prolonged communication between the gateway 170 and the IED 232 via the second secure communication link established in accordance with the second mode. In another example, the IED 232 may monitor data being communicated between the gateway 170 and the IED 232. In response to a determination that the data is to be communicated via the third secure communication link established in accordance with the first mode (e.g., based on a type of the data), the IED 232 may indicate that the third secure communication link is to be established in accordance with the first mode.

In additional or alternative embodiments, the IED 232 may receive an indication that the third secure communication link is to be established in accordance with the first mode and may initiate the procedure for establishing the third secure communication link in accordance with the first mode in response. As an example, the computing device 178 may output a request (e.g., via a user input) to the gateway 170, and the gateway 170 may transmit the request to the IED 232. In response to receiving the request, the IED 232 may indicate that the third secure communication link is to be established in accordance with the first mode.

In further embodiments, the gateway 170 may automatically establish the third secure communication link in accordance with the first mode. For instance, the gateway 170 may monitor a duration in which the second secure communication link has been established and may establish the third secure communication link in accordance with the first mode based on the duration exceeding a threshold duration, and/or the gateway 170 may monitor data being communicated between the gateway 170 and the IED 232 and may establish the third secure communication link in accordance with the first mode based on the data.

At block 352, the IED 232 may communicate data with the gateway 170 via the third secure communication link established in accordance with the first mode. That is, the IED 232 may use the new SAK received from the gateway 170 to encrypt data to be transmitted to the gateway 170 via the third secure communication link, and/or the IED 232 may use the new SAK to decrypt encrypted data received from the gateway 170 via the third secure communication link. The third secure communication link may enable an external device to view the data encrypted by the new SAK and transmitted between the gateway 170 and the IED 232 by an external device.

Figure 7:
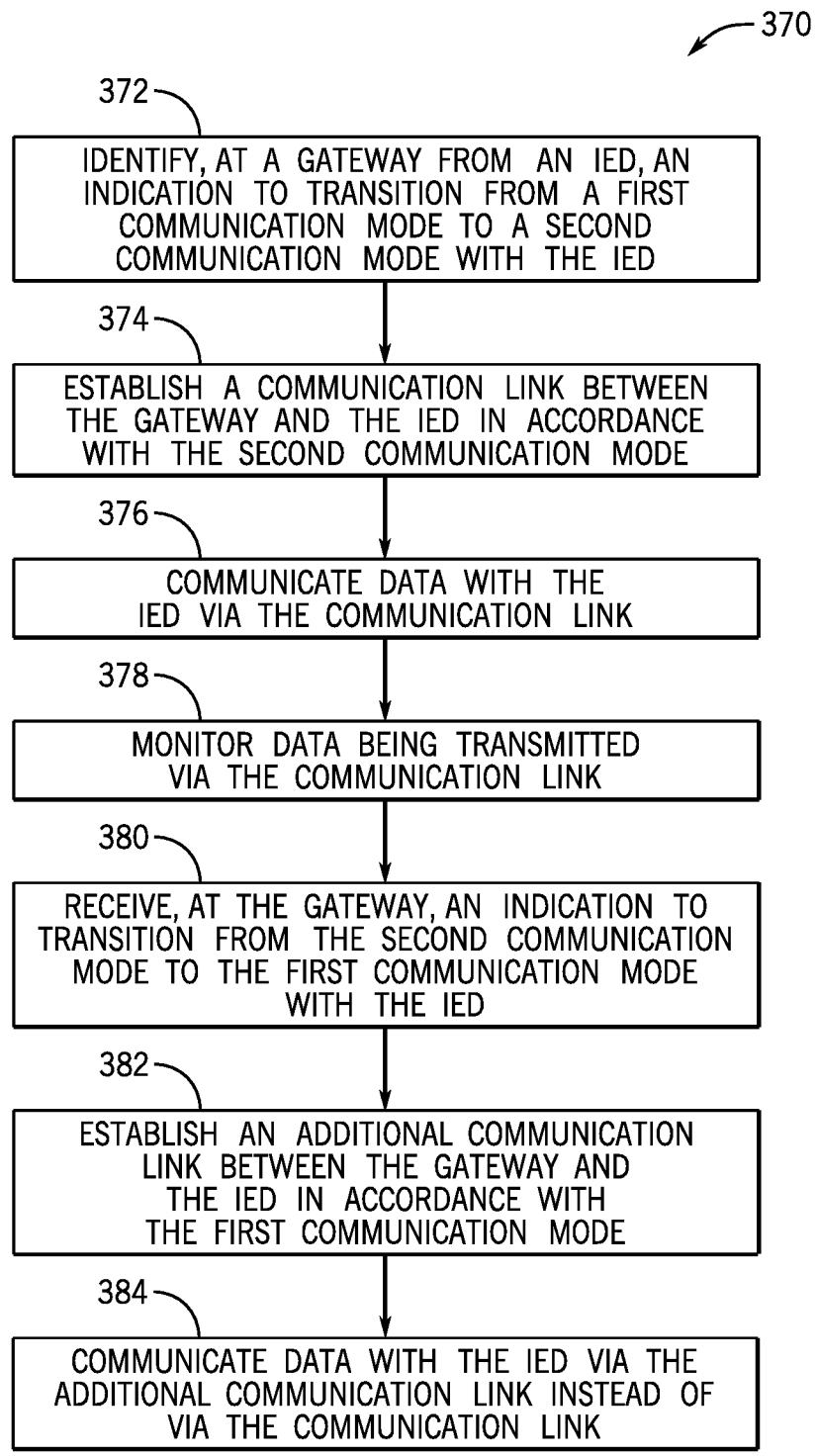
FIG. 7 is a flowchart of an embodiment of another method for adjusting a mode of a secure communication link established between a gateway and an IED, in accordance with an embodiment of the present disclosure of the present disclosure.

FIG. 7 is a flowchart of an embodiment of a method 370 for adjusting a mode of a secure communication link. The method 370 is described from the perspective of the gateway 170 for adjusting a mode of a secure communication link established between the IED 232 and the gateway 170, but a similar method may be performed to adjust a mode of a secure communication link established between other components, such as two IEDs. For example, the method 370 may be performed while there is currently a first secure communication link (e.g., a first MACsec communication link) established between the IED 232 and the gateway 170 in accordance with a first mode, which may be a non-confidential mode that enables an external device (e.g., the device 246) to access communication traffic associated with the first secure communication link. At block 372, the gateway 170 may identify an indication to establish a second secure communication link (e.g., a second MACsec communication link) with the IED 232 in accordance with a second mode, which may be a confidential mode. By way of example, the gateway 170 may identify that the IED 232 has modified a CKN, such as in response to a request (e.g., transmitted by the gateway 170, by the computing device 178) received by the IED 232, data (e.g., a user credential, a user identifier, a user permission) received by the IED 232, thereby indicating that the second secure communication link is to be established in accordance with the second mode. Additionally or alternatively, the gateway 170 may identify a user input and/or a distributed SAK indicative that the second secure communication link is to be established in accordance with the second mode.

At block 374, the gateway 170 may establish the second secure communication link with the IED 232 in accordance with the second mode in response to identification of the indication with respect to block 372. By way of example, the gateway 170 may generate an SAK specifically for establishing the second secure communication link in accordance with the second mode, and the gateway 170 may transmit a copy of an SAK to the IED 232 (e.g., via a connectivity association already established between the gateway 170 and the IED 232). At block 376, the gateway 170 may communicate data with the IED 232 via the second secure communication link. For instance, the gateway 170 may use the SAK to encrypt data to be transmitted to the IED 232 via the second secure communication link, and/or the gateway 170 may use the SAK to decrypt encrypted data received from the IED 232 via the second secure communication link. The second secure communication link may block an external device from viewing the data encrypted by the SAK and transmitted between the gateway 170 and the IED 232.

At block 378, the gateway 170 may monitor the communication traffic associated with the second secure communication link. By way of example, the gateway 170 may monitor the data transmitted via the second secure communication link. In some embodiments, the gateway 170 may monitor the data to determine whether the gateway 170 and/or the IED 232 is operating as desired, whether the data is being transmitted as expected, and so forth. In additional or alternative embodiments, the gateway 170 may record and/or store the data being transmitted between the gateway 170 and the IED 232 via the second secure communication link. Such data may be made available and retrievable at a later time (e.g., via an external device).

At block 380, the gateway 170 may receive an indication to establish a third secure communication link with the IED 232 in accordance with the first mode. That is, the gateway 170 may determine that the gateway 170 and the IED 232 are to communicate data with one another via the third secure communication link established in accordance with the first mode instead of via the second secure communication link established in accordance with the second mode. In certain embodiments, the gateway 170 may automatically initiate the procedure for establishing the third secure communication link in accordance with the first mode. As an example, the gateway 170 may monitor a duration in which the second secure communication link has been established between the gateway 170 and the IED 232 in accordance with the second mode. In response to determining that the duration has exceeded a threshold duration, the gateway 170 may automatically determine that the third secure communication link is to be established in accordance with the first mode to replace the second secure communication link, thereby blocking prolonged communication between the gateway 170 and the IED 232 via the second secure communication link established in accordance with the second mode. As another example, the gateway 170 may monitor data being transmitted between the gateway 170 and the IED 232. In response to a determination that the data is to be communicated via the third secure communication link established in accordance with the first mode, the gateway 170 may automatically determine that the third secure communication link is to be established to replace the second secure communication link. In additional or alternative embodiments, the gateway 170 may identify the third secure communication link is to be established in accordance with the first mode based on an action performed by the IED 232, such as based on the IED 232 modifying a CKN (e.g., in response to a user input).

At block 382, the gateway 170 may establish the third secure communication link between the gateway 170 and the IED 232 in accordance with the first mode. For example, the gateway 170 may transmit a new SAK (e.g., via the already established connectivity association) that is specifically generated to establish the third secure communication link in accordance with the first mode. At block 384, the gateway 170 may communicate data with the IED 232 via the third secure communication link established in accordance with the first mode. That is, the gateway 170 may use the new SAK to encrypt data to be transmitted to the IED 232 via the third secure communication link, and/or the gateway 170 may use the new SAK to decrypt encrypted data received from the IED 232 via the third secure communication link. The third secure communication link may enable an external device to view data encrypted by the new SAK and transmitted between the gateway 170 and the IED 232.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A control system of an intelligent electronic device (IED) of an electric power distribution system, the control system comprising a tangible, non-transitory, computer-readable medium comprising instructions, wherein the instructions, when executed by processing circuitry, are configured to cause the processing circuitry to perform operations comprising:
   communicating first data via a first media access control security (MACsec) communication link established in accordance with a first mode configured to enable viewing of the first data transmitted via the first MACsec communication link;
   determining a second MACsec communication link is to be established in accordance with a second mode configured to block viewing of second data transmitted via the second MACsec communication link;
   indicating that the second MACsec communication link is to be established in accordance with the second mode;
   establishing the second MACsec communication link in accordance with the second mode;
   communicating the second data via the second MACsec communication link
   determining a third MACsec communication link is to be established in accordance with the first mode;
   indicating that the third MACsec communication link is to be established in accordance with the first mode;
   establishing the third MACsec communication link in accordance with the first mode; and
   communicating third data via the third MACsec communication link.

2. The control system of claim 1, wherein the second MACsec communication link replaces the first MACsec communication link.

3. The control system of claim 1, wherein the instructions, when executed by the processing circuitry, are configured to perform operations comprising:
   receiving a user input; and
   determining the third MACsec communication link is to be established in accordance with the first mode based on the user input.

4. The control system of claim 1, wherein the second MACsec communication link is established between the IED and a gateway of the electric power distribution system.

5. The control system of claim 1, wherein the instructions, when executed by the processing circuitry, are configured to cause the processing circuitry to perform operations comprising:
   communicating the first data via the first MACsec communication link by using a first SAK; and
   communicating the second data via the second MACsec communication link by using a second SAK.

6. A system, comprising:
   an intelligent electronic device (IED); and
   a gateway configured to perform operations comprising:
      communicating data with the IED via a first media access control security (MACsec) communication link established between the gateway and the IED in accordance with a first mode configured to enable an external device to access data transmitted via the first MACsec communication link;
      determining a second MACsec communication link is to be established between the gateway and the IED in accordance with a second mode based on an indication made by the IED configured to block the external device from accessing data transmitted via the second MACsec communication link;
      generating a security association key (SAK) based on the determination that the second MACsec communication link is to be established between the gateway and the IED in accordance with the second mode;

transmitting a copy of the SAK to the IED to establish the second MACsec communication link in accordance with the second mode; and communicating data with the IED via the second MACsec communication link.

7. The system of claim 6, wherein the gateway is configured to receive a user input and to transmit the user input to the IED, and the IED is configured to indicate that the second MACsec communication link is to be established in accordance with the second mode in response to receipt of the user input.

8. The system of claim 6, wherein the gateway is configured to monitor, store, record, or any combination thereof, the data transmitted via the second MACsec communication link.

9. The system of claim 6, wherein the gateway is configured to perform operations comprising using the SAK to encrypt data to be transmitted to the IED via the second MACsec communication link, using the SAK to decrypt encrypted data transmitted from the IED via the second MACsec communication link, or both.

10. The system of claim 6, wherein the gateway is configured to perform operations comprising:

transmitting a connectivity association key (CAK) to the IED;

establishing a connectivity association between the gateway and the IED based on verification that the IED possesses the CAK; and transmitting the copy of the SAK to the IED via the connectivity association.

11. A system, comprising:

an intelligent electronic device (IED); and a gateway configured to perform operations comprising:

transmitting a connectivity association key (CAK) to the IED;

establishing a connectivity association between the gateway and the IED based on verification that the IED possesses the CAK;

communicating data with the IED via a first media access control security (MACsec) communication link established between the gateway and the IED in accordance with a first mode configured to enable an external device to access data transmitted via the first MACsec communication link;

determining a second MACsec communication link is to be established between the gateway and the IED in accordance with a second mode configured to block the external device from accessing data transmitted via the second MACsec communication link;

generating a security association key (SAK) based on the determination that the second MACsec communication link is to be established between the gateway and the IED in accordance with the second mode;

transmitting a copy of the SAK to the IED via the connectivity association between the gateway and the IED to establish the second MACsec communication link in accordance with the second mode; and communicating data with the IED via the second MACsec communication link.

* * * * *